(12) United States Patent
Lee et al.

(10) Patent No.: US 7,512,310 B2
(45) Date of Patent: Mar. 31, 2009

(54) BACKLIGHT UNIT OF A LIQUID CRYSTAL DISPLAY DEVICE

(75) Inventors: Dong Ho Lee, Ulsan-si (KR); Won Ki Cho, Yangsan-si (KR); Wan Soo Han, Hwaseong-si (KR); Ho Seok Ko, Suwon-si (KR); Sang Hoon Lee, Hwaseong-si (KR); Hee Chan Eum, Hwaseong-si (KR); Jong Kyo Jeong, Pyungtaek-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 3 days.

(21) Appl. No.: 11/727,051

(22) Filed: Mar. 23, 2007

(65) Prior Publication Data

US 2008/0007970 A1 Jan. 10, 2008

(30) Foreign Application Priority Data

Jul. 4, 2006 (KR) ...................... 10-2006-0062729

(51) Int. Cl.
G02B 6/10 (2006.01)
(52) U.S. Cl. .................. 385/146; 385/129; 362/623
(58) Field of Classification Search ................ 385/146, 385/129; 362/623
See application file for complete search history.

(56) References Cited

U.S. PATENT DOCUMENTS

| | | | |
|---|---|---|---|
| 5,919,551 A * | 7/1999 | Cobb et al. ............... 428/156 |
| 6,323,919 B1 | 11/2001 | Yang et al. |
| 6,607,279 B2 * | 8/2003 | Niida et al. .................... 362/26 |
| 6,633,722 B1 * | 10/2003 | Kohara et al. ............... 385/146 |
| 7,108,417 B2 * | 9/2006 | Maeda et al. ............... 362/626 |
| 7,156,548 B2 * | 1/2007 | Teng et al. ................... 362/625 |
| 7,206,491 B2 * | 4/2007 | Feng et al. ................... 385/146 |
| 7,312,839 B2 | 12/2007 | Lee et al. |
| 7,313,309 B2 * | 12/2007 | Numata et al. ............. 385/130 |
| 2002/0051355 A1 * | 5/2002 | Egawa et al. .................. 362/31 |
| 2003/0090888 A1 * | 5/2003 | Mizutani et al. .............. 362/31 |
| 2004/0022515 A1 * | 2/2004 | Sugiura et al. .............. 385/146 |
| 2004/0071436 A1 * | 4/2004 | Kwon ......................... 385/146 |
| 2007/0217227 A1 * | 9/2007 | Watanabe et al. ........... 362/615 |

FOREIGN PATENT DOCUMENTS

| | | |
|---|---|---|
| JP | 08-179697 | 7/1996 |
| JP | 2000-089033 | 3/2000 |
| JP | 2000-111900 | 4/2000 |
| JP | 2003-215578 | 7/2003 |
| KR | 10-2002-0031566 | 5/2002 |
| KR | 10-2003-0039600 A | 5/2003 |
| KR | 10-2003-0040850 A | 5/2003 |
| KR | 10-2003-0078305 | 10/2003 |
| KR | 10-2006-0013318 | 2/2006 |

* cited by examiner

*Primary Examiner*—Ellen Kim
(74) *Attorney, Agent, or Firm*—Lee & Morse, P.C.

(57) ABSTRACT

A light guide member for guiding light received from a light source, the light source illuminating light toward the light guide member, the light guide member may include a plurality of first grooves on a first side of the light guide member, the first grooves extending along a first direction crossing a zero-degree radiation angle of the light from the light source, wherein an angle of a reflective face of the first groove increases approaching away from the light source of the light source.

20 Claims, 4 Drawing Sheets

BACKLIGHT UNIT OF A LIQUID CRYSTAL DISPLAY DEVICE

BACKGROUND OF THE INVENTION

1. Field of the Invention

The invention relates to a light guide member and a backlight unit including a light guide member. More particularly, the invention relates to a light guide member for guiding light traveling therein and providing uniformly distributed light, and a backlight unit employing such a light guide member.

2. Description of the Related Art

A light guide member may be employed, e.g., by an illumination device of a display device, to receive light from a light source of the illumination device and guide the received light so as to provide light having a uniform luminance distribution to a display panel of the display device. For example, a flat panel display device, e.g., a liquid crystal display (LCD), may include an illumination device, e.g., a backlight unit (BLU), which may include a light guide member.

There is a demand for improved display devices in, e.g., the information and communication industries. More particularly, e.g., higher resolution, lighter, thinner, and/or less power consuming display devices are desired. One possible approach for developing such improved display devices is to provide thinner and lighter BLUs and/or improved light guide members capable of providing light having a more uniform luminance distribution.

For example, one type of flat panel display that is widely used today is thin film transistor-liquid crystal displays (TFT-LCDs). Such TFT-LCDs may include a LCD panel in which liquid crystal is provided between two substrates, a BLU as an illumination device positioned in a lower portion of the LCD panel, and a LCD drive IC (LDI) for driving the LCD panel. The BLU unit may include, e.g., a light source, a light guide member, an optical sheet including a diffusion sheet and a prism sheet.

The light source may supply non-uniformly distributed linear light to the light guide member. Generally, the light guide member is to modify the non-uniformly distributed linear light and output planar light having a uniform optical distribution. However, conventional light guide members fall short of outputting uniformly distributed linear light. For example, portions of the light guide member arranged between, and in close proximity to, light sources of the illumination device may provide less light, i.e., appear darker, than portions of the light guide member arranged substantially along a zero-degree radiation angle of the respective light source.

More particularly, in general, as the radiation angle of light from the light source increases, light intensity decreases. The diffusion of light is also generally weak at a portion of a light guide member close to the light source. Thus, e.g., at portions of the light guide member receiving light from the light source via relatively larger radiation angles and/or beyond a radiation angle of the light, the intensity of light output from the light guide member may not have a uniform luminance distribution. As a result of such non-uniformity, a luminance distribution of light from the light guide member may include a bright line, bright area and/or dark area close to the light source, i.e., a bright line/area effect. Such a bright line/area effect may be particularly prominent at portions of the light guide member that do not overlap with or are not aligned with light sources of a light source unit. When light having a non-uniform luminance distribution is provided to a display device, image quality of the display device may be hindered.

In view of such shortcomings of the light guide member, a BLU employing such light guide members may include a plurality of optical sheets, e.g., a diffusion sheet and a prism sheet, in an attempt to provide light having a more uniformly distributed luminance to the display device. However, having to provide additional optical sheets may increase, e.g., the cost, weight and/or size of the BLU.

SUMMARY OF THE INVENTION

It is an object of the invention to provide a light guide member and a backlight unit including such a light guide member, which substantially overcome one or more of the problems due to limitations and disadvantages of the related art.

It is therefore a feature of embodiments of the invention to provide a light guide member capable of guiding light to output light having a more uniform luminance distribution relative to conventional light guide members.

It is therefore a separate feature of embodiments of the invention to provide a backlight unit employable by a LCD device capable of improving image quality of the display device by providing light having a substantially uniform and/or completely uniform luminance distribution.

It is therefore a separate feature of embodiments of the invention to provide a light guide member capable of guiding light to output light having an entirely uniform luminous distribution.

It is therefore a separate feature of embodiments of the invention to provide a thinner and/or lighter BLU.

It is therefore a separate feature of embodiments of the invention to provide a BLU employing only a prism sheet as an optical member.

At least one of the above and other features and advantages of the invention may be realized by providing a light guide member for guiding light received from a light source, the light guide member including a plurality of first grooves on a first side of the light guide member, the first grooves extending along a first direction, wherein an angle of a reflective face of the first grooves may respectively increase as a distance from the light increases, source such that the angle of the reflective face of one of the first grooves arranged closer to the light source may be smaller than the angle of the reflective face of one of the first grooves arranged relatively further away from the light source.

The first grooves may have a substantially V-like cross-sectional shape, taken along a direction crossing the first direction. The angles of the reflective faces of the first grooves may have a value of, or between, about 0.5° to about 10°. At least one of a depth and a vertical angle of the first grooves may be constant. The depth of the first grooves may have a value of, or between, about 0.001 mm to about 0.01 mm. The vertical angle of the first grooves may have a value of, or between, about 120° to about 170°. A pitch of the first grooves may decrease as a distance from the light source increases. The pitch of the first grooves may have values of, or between, about 0.1 mm to about 0.3 mm on one portion of the light guide member to about 0.03 mm to about 0.1 mm at another portion of the light guide member.

The light guide member may include a second groove on a second side of the light guide member, wherein the second side may oppose the first side, and the second groove may extend along a second direction, and the second direction may be substantially perpendicular to the first direction. The second groove may have a substantially V-like cross-sectional shape, and a vertical angle of the second groove has a value of or between about 90° to about 120°. The second groove may have a depth of about 0.005 mm to about 0.01 mm and may be arranged at a pitch of about 0.01 mm to about 0.1 mm. The first direction may cross a zero-degree radiation angle of the light from the light source.

At least one of the above and other features and advantages of the invention may be separately realized by providing backlight unit (BLU) employable by a display device including a display panel, the BLU may include a light source, a light guide member to which light from the light source is incident, the light guide member including a plurality of first grooves on a first side of the light guide member, the first grooves extending along a first direction, and an optical member providing the light provided from the light guide member to the display panel, wherein an angle of a reflective face of the first grooves may increase as a distance from the light source increases, such that the angle of the reflective face of one of the first grooves arranged closer to the light source is smaller than the angle of the reflective face of one of the first grooves arranged relatively further away from the light source.

The light source may include at least one of a cold cathode fluorescent tube and a LED. The angles of the reflective faces of the first grooves may respectively have a value of, or between, about 0.5° to about 10°. The optical member may include a prism sheet. The optical member may not include a diffusion sheet. The first grooves may have has a substantially V-like cross-sectional shape, taken along a direction crossing the first direction.

A pitch of the first grooves may decrease approaching away from the light source. The pitch of the first grooves may have values of, or between, about 0.1 mm to about 0.3 mm on one portion of the light guide member to about 0.03 mm to about 0.1 mm at another portion of the light guide member.

At least one of the above and other features and advantages of the invention may be separately realized by providing a light guide member for guiding light received from a light source, the light guide member including a plurality of first features on a first side of the light guide member, each first feature including a reflective face, wherein a percentage of light incident on the reflective face exiting the light guide member increases as a distance from the light source increases

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Korean Patent Application No. 10-2006-0062729, filed on Jul. 4, 2006, in the Korean Intellectual Property Office, and entitled: "Backlight Unit of a Liquid Crystal Display Device," is incorporated by reference herein in its entirety.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In the following description, references made to "first," "second," etc. merely serve to identify different elements and/or features of different elements and, unless specified otherwise, the features may or may not have the same values.

Figure 1:
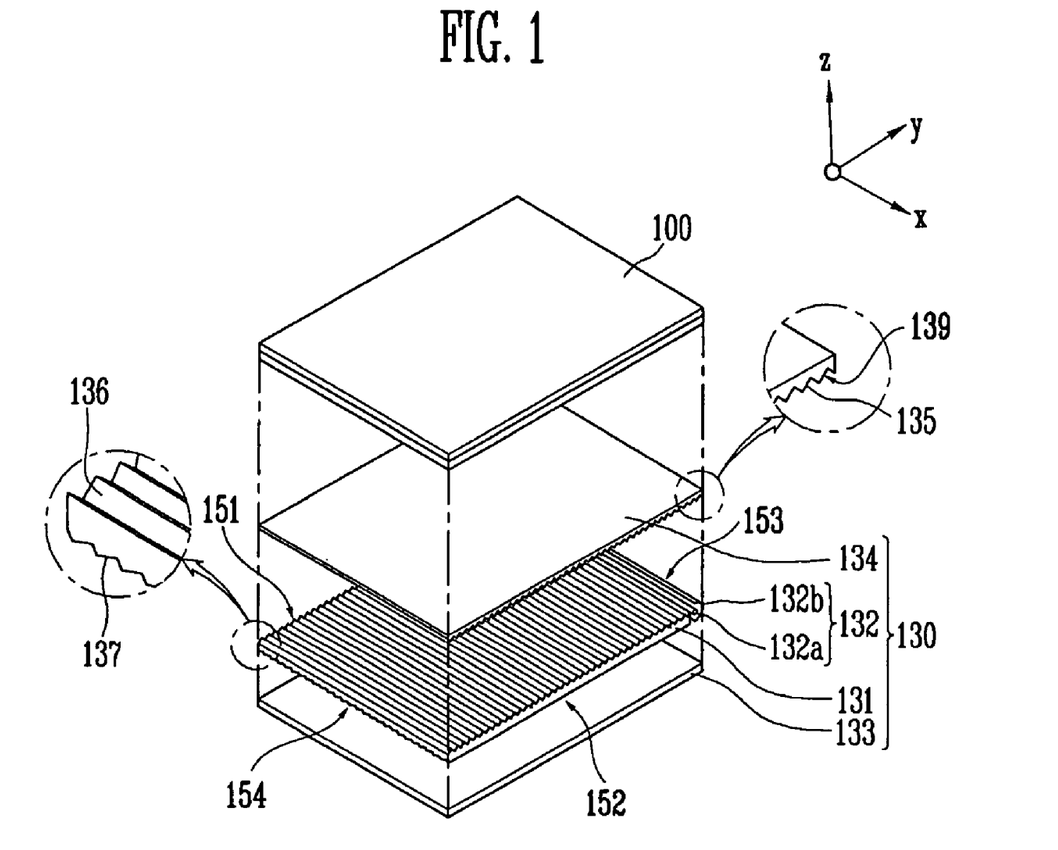
FIG. 1 illustrates an exploded perspective view of parts of an exemplary liquid crystal display device employing an exemplary embodiment of a backlight unit and a light guiding member according to one or more aspects of the invention.

FIG. 1 illustrates an exploded perspective view of an exemplary liquid crystal display (LCD) device, as an exemplary device, employing an exemplary embodiment of a backlight unit (BLU) and an exemplary embodiment of a light guiding member according to one or more aspects of the invention.

Referring to FIG. 1, a liquid crystal display device may include a LCD panel 100 and a BLU 130. The BLU 130 may provide light to the LCD panel 100 such that images may be displayed on the LCD panel 100.

The LCD panel 100 may include two substrates disposed opposite each other, a liquid crystal layer provided between the two substrates, and a pixel region (not shown) defined by, e.g., a plurality of gate lines and data lines arranged on the substrates in, e.g., a matrix-type manner. A thin film transistor and a pixel electrode may be formed at respective portions of one of the substrates corresponding to intersecting portions of the gate lines and data lines formed thereon (not shown). Each pixel electrode may be connected to the respective thin film transistor, and each thin film transistor may control signals respectively supplied to the respective pixel(s). A color filter (not shown) and a common electrode (not shown) may be formed on the other of the substrates. A polarizing film (not shown) may be provided on an outer side of each of the substrates.

The BLU 130 may include a light guide member 131, a light source 132, an optical member 134, and a reflective member 133. The light source unit 132 may supply light to the light guide member 131. The light guide member 131 may change a distribution of light provided from the light source unit 132. The reflective member 133 may reflect light received thereon back toward the LCD panel 100.

The optical member 134 may collect and reflect the light having a uniform luminance distribution, help enhance brightness of the display device, and/or only allow light with a predetermined incident angle to pass through. For example, the optical member 134 may include a prism sheet that only allows substantially vertical light to pass through, while light having other incident angles may be reflected toward the reflective member 133 before being reflected back again toward the optical member 134, until the light vertically passes through the optical member 134 toward the LCD panel 100.

The light guide member 131 may change a distribution of light concentrated on a plurality of small areas thereof, and may thereby provide uniform light over a relatively larger area corresponding to, e.g., the plurality of small areas and/or an entire area of, e.g., the second side of the light guide member. The light guide member 131 may have a thin-plate-like shape, e.g., cuboid shape. The light guide member 131 may include, e.g., transparent resin such as, e.g., acryl or polycarbonate, etc.

The light guide member 131 may include a first side 151, a second side 152, a third side 153, and a fourth side 154. The first side 151 and the second side 152 may oppose each other, and the third side 153 and the fourth side 154 may oppose each other. More particularly, the third side 153 and the fourth side 154 may extend between and connect respective portions of the first side 151 and the second side 152 together. The first side 151, e.g., exit side, of the light guide member 131 may face the optical member 134 of the BLU 130, and the second side 152, e.g., reflective side, of the light guide member 131 may face the reflective member 133.

The light source unit 132 may include one or more light sources 132a disposed on one or more sides, e.g., the third side 153, of the light guide member 131, and one or more reflective panels 132b reflecting light radiated from the light source(s) 132a back toward the light guide member 131. A point light source, such as a light emitting diode (LED) light-emitting white light, may be used as the light source 132a, and one or more light sources may be arranged depending on a size of the light guide member 131. A BLU may employ, e.g., a cold cathode fluorescent lamp (CCFL) and/or an LED as a light source 132a. CCFLs may generally be employed in BLUs for larger-sized display devices, and LEDs may generally be employed in BLUs for smaller-sized display devices.

In the exemplary embodiment of the BLU illustrated, the light sources 132a are arranged on a single side, i.e., the third side 153, of the light guide member. That is, in embodiments of the invention, the light guide member 131 may only receive light from one side, e.g., the third side 153 of the light guide member 131. However, embodiments of the invention are not limited to such an arrangement.

The optical member 134 may include a prism sheet. In embodiments of the invention, the optical member 134 may only include a prism sheet. In embodiments of the invention, the optical member 134 may not include a diffusion sheet. Referring to FIG. 1, the optical member 134 may include one or more grooves 135 formed on a side 139 facing the light guide member 131. The prism sheet of the optical member 134 may help improve the vertical directionality of the light by diffusing and collecting light incident from the light guide member 131 in a vertical direction toward, e.g., the LCD panel 100.

The light guide member may include first grooves 136 and/or second grooves 137. The first grooves 136 may extend along a first direction, e.g., x-direction, on the first side 151 of the light guide member 131. The first direction may be substantially perpendicular to a zero-degree radiation angle of light emitted from the light source 132a of the BLU 130. The second grooves 137 may extend along a second direction, e.g., y-direction, on the second side 152 of the light guide member 131. The second direction may be substantially parallel to the zero-degree radiation angle of light emitted from the light source 132a of the BLU 130.

The first grooves 136 and the second grooves 137 may extend along directions that are substantially orthogonal to each other. When light is provided to one or more sides, e.g., the third side 153, of the light guide member 131, an optical path and distribution of the received light may be changed by, e.g., the first and second grooves 136, 137.

The first grooves 136 and/or the second grooves 137 may be substantially V-shaped grooves. More particularly, in embodiments of the invention, irrespective of a depth and/or a width of the first grooves 136 and/or the second grooves 137, a cross-sectional shape of the first grooves 136 and/or the second grooves 137 may be substantially triangular-like or V-like, as taken along a line extending along the second direction and the first direction, respectively. Embodiments of the invention are not limited to such structures. For example, in embodiments of the invention, the first grooves 136 may be formed on the second side 152 of the light guide member 131, and the second grooves 137 may be formed on the first side 151 of the light guide member 131.

Figure 2A:
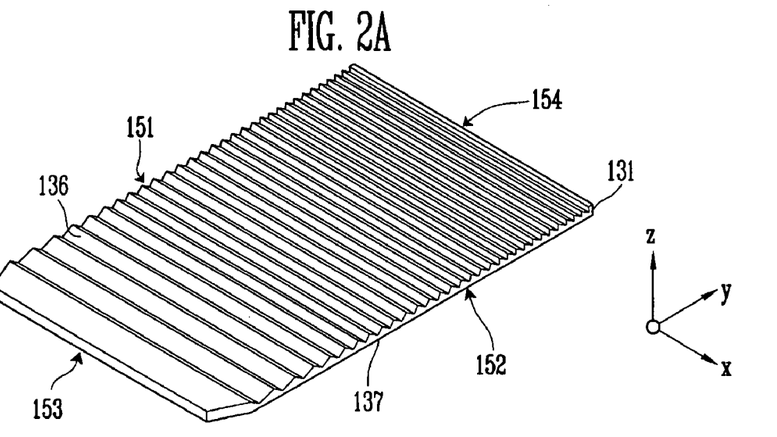
FIG. 2A and FIG. 2B illustrate top and bottom perspective views of an exemplary embodiment of a light guide member according to one or more aspects of the invention.
Figure 2B:
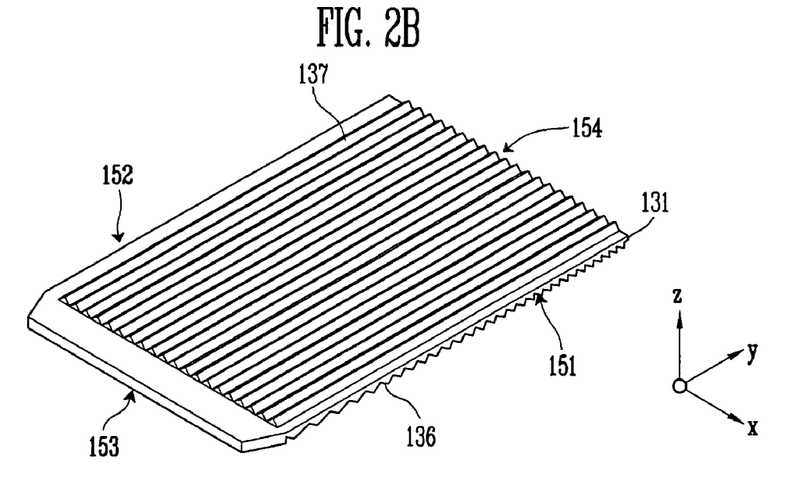
Figure 2C:
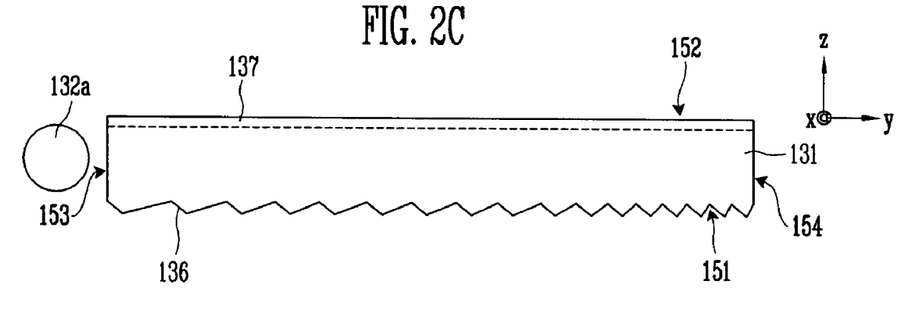
FIG. 2C illustrates a cross-sectional view of the exemplary embodiment of a light guide member and light source illustrated in FIG. 2B, as taken along the second direction.

FIGS. 2A and 2B illustrate top and bottom perspective views of an exemplary embodiment of a light guide member according to one or more aspects of the invention; and FIG. 2C illustrates a cross-sectional view of the exemplary embodiment of the light guide member and light source illustrated in FIG. 2B, as taken along the second direction.

In the exemplary embodiment of the light guide member 131 illustrated in FIG. 2A, the first grooves 136 may be formed on the first side 151 of the light guide member 131, and the second grooves 137 may be formed on the second side 152 of the light guide member 131. The first grooves 136 may extend along the first direction, e.g., x-direction. The first direction may be substantially perpendicular to a direction of the zero-degree radiation angle of light emitted from the light source 132. The second grooves 137 may extend along the second direction, e.g., y-direction. The second direction may be substantially parallel to the zero-degree radiation angle of light emitted from the light source 132 and/or the first direction.

Referring to FIGS. 2B and 2C, the second grooves 137 may be formed on the first side 151 of the light guide member 131. The first grooves 136 may extend along the first direction, e.g., x-direction, substantially perpendicular to a direction of the zero-degree radiation angle of light emitted from the light source 132. The second grooves 137 may extend along the second direction, e.g., y-direction, substantially parallel to the zero-degree radiation angle of light emitted from the light source 132.

As illustrated in FIGS. 2A to 2C, the first grooves 136 and the second grooves 137 may have substantially V-shaped cross-sectional shapes, taken along a line crossing a direction along which the respective one of the first groove 136 or the second groove 137 extends. Although the exemplary embodiment illustrated in FIGS. 2A to 2C illustrate the first grooves 136 on the first side 151 of the light guide member 131 and the second grooves 137 on the second side 152 of the light guide member 131, embodiments of the invention are not limited to such a structure. For example, the first grooves 136 may be formed on the second side 152 of the light guide member 131 and the second grooves 137 may be formed on the first side 151 of the light guide member 131.

Figure 3A:
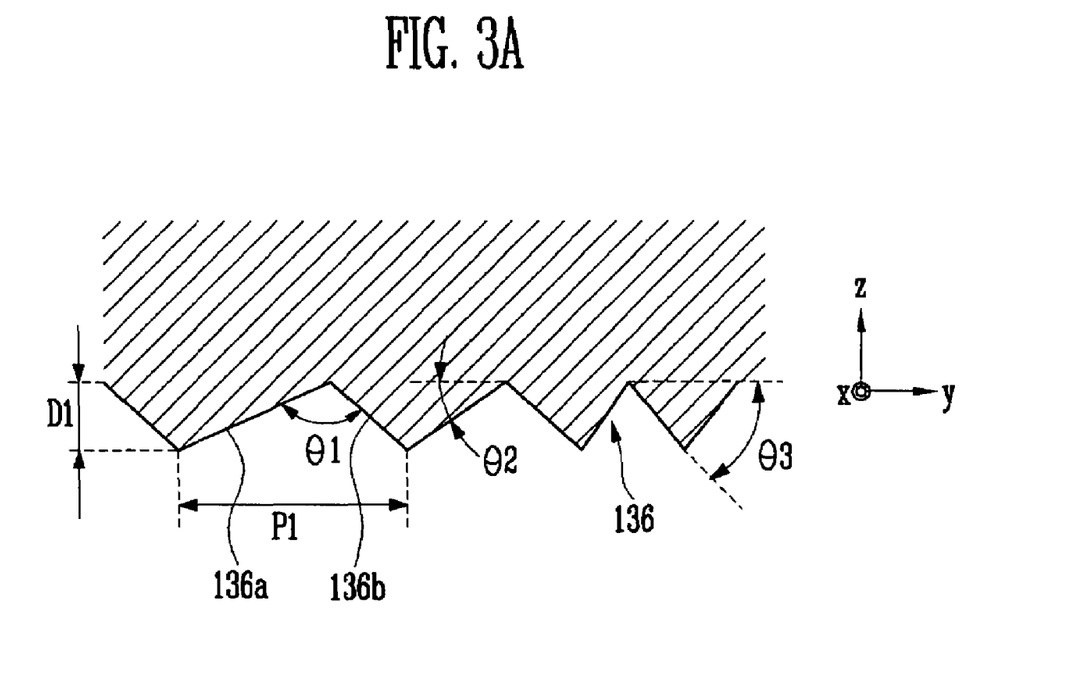
FIG. 3A illustrates a partial cross-sectional view of a portion of the exemplary embodiment of a light guide member employing one or more aspects of the invention, taken along the second direction, including an exemplary embodiment of the first grooves.

FIG. 3A illustrates a partial cross-sectional view of a portion of the exemplary embodiment of the light guide member, taken along the y-direction, including an exemplary embodiment of the first grooves.

In embodiments of the invention, each of the first grooves 136 may have, e.g., a V-shaped like cross-sectional shape, a vertical angle θ1, an angle of a reflective face, i.e., front angle θ2, and a rear angle θ3, as shown in FIG. 3A. The vertical angle θ1 may be formed between two inner sides 136a, 136b of the first groove 136. The front angle θ2 may be formed between the inner side 136a to be arranged closer to the light source 132a and/or the third side 153 of the light guide member 131. Each of the first grooves 136 may have a predetermined depth D1 and pitch P1.

In the exemplary embodiment illustrated in FIG. 3A, the depth D1 and the rear angle E3 may be constant among the first grooves 136, i.e., each of the first grooves 136 may have the same depth D1 and the same rear angle E3, and the respective front angles θ2 of the first grooves 136 may increase as a distance from the light source 132a increases, i.e., a distance from the third side 153 of the light guide member 131 increases. That is, the front angles θ2 of the first grooves 136 closer to the light source unit 132 may be smaller than an angle of the reflective face θ2 of the first grooves 136 relatively further away from the light source unit 132. In embodiments of the invention, a length of the inner side 136a closer to the third side, e.g., 153, of the light guide member 131, may be longer than a length of the other inner side 136b. The pitch P1 of the first grooves 136 may decrease, i.e., not be constant, as a distance from the light source 132a increases, and/or a value of the vertical angle θ1 of the first grooves 136 may decrease as a distance from the light source 132a increases.

In other embodiments of the invention, e.g., the pitch P1 of the first grooves 136 may be constant among the first grooves 136. In such embodiments, however, e.g., the value of rear angle θ3 of the first grooves 136 may decrease as a distance from the light source 132a increases.

In embodiments of the invention, the depth D1 of the first grooves 136 may be constant among all the first grooves 136, and may have a value of, or between, about 0.001 mm to about 0.10 mm. The vertical angle θ1 may be constant among all the first grooves 136, and may have a value of, or between, about 120° to about 170°.

Figure 4:
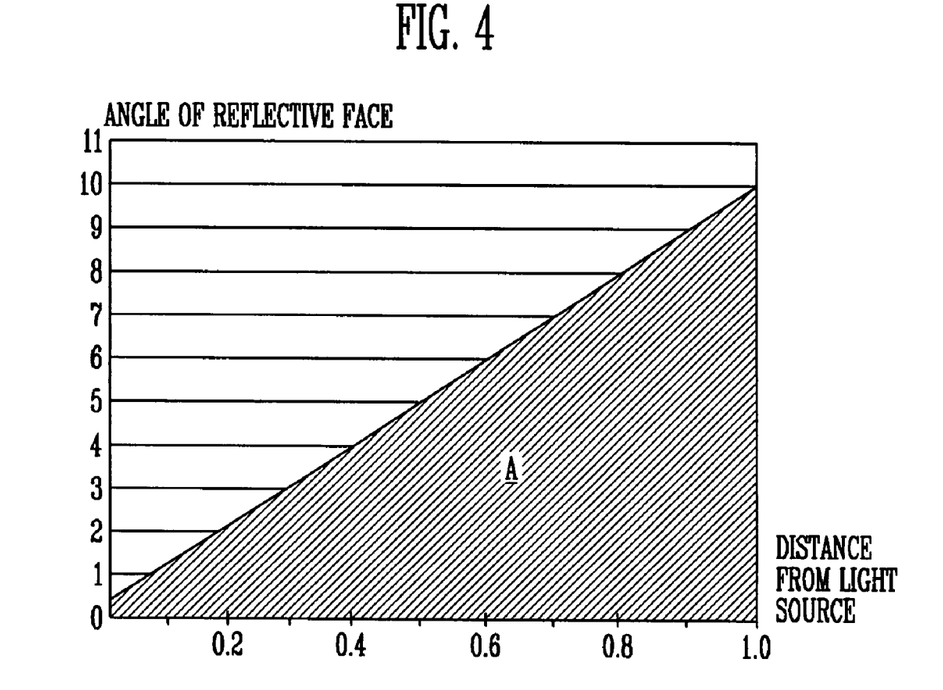
FIG. 4 illustrates a graph of a relationship between an angle of a reflective face of the first grooves and a distance from a light source.

The front angle θ2 of the first grooves 136 may increase in a non-linear manner, approaching away from the light source 132a. More particularly, the front angle θ2 may increase, e.g., within a range A and may have, e.g., values of, or between, about 0.5° to about 10°, as shown in FIG. 4. For example, in embodiments of the invention, the front angle θ2 of the first grooves 136 at an end portion of the light guide member 131 close to the light source unit 132 and/or the third side 153 may be about 0.5° at and the front angle θ2 of the first grooves 136 at another end portion of the light guide member 131, opposite to where the light source unit 132 is provided, may be about 10°.

In embodiments of the invention, the pitch P1 may decrease in a non-linear manner and may have values of, or between, about 0.1 mm to about 0.3 mm to a value of, or between, about 0.03 mm to about 0.1 mm, as a distance from the light source 132a increases. For example, the pitch P1 may have a value of about 0.1 mm to about 0.3 at, e.g., the end portion of the light guide member 131 close to the light source 132a, and may be about 0.03 mm to about 0.1 mm at an end portion of the light guide member 131 opposite to where the light source 132a is provided.

For example, a value of the pitch P1 may be determined employing Equation 1, below.

$$P=d*\{\tan(\text{radians}(90-a))+\tan(\text{radians}(90-b))\} \quad \text{[Equation 1]}$$

In Equation 1, d may be the depth D1, a may be the front angle θ2, b may be the rear angle θ3, and P may be the pitch P1. The rear angle E3 may be =(180°−vertical angle θ1−the front angle θ2).

Figure 3B:
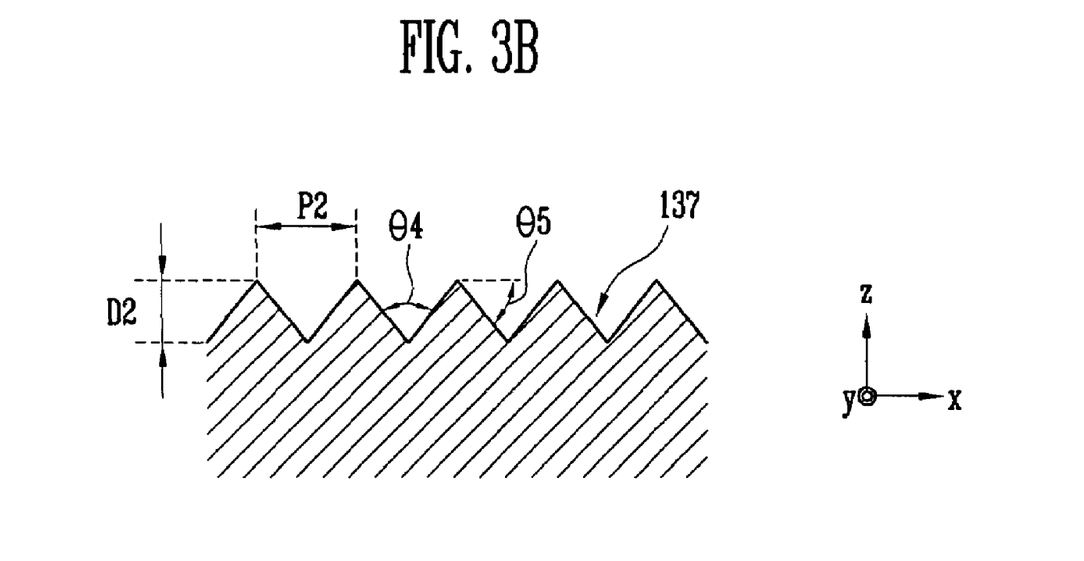
FIG. 3B illustrates a partial cross-sectional view of the exemplary embodiment of a light guide member employing one or more aspects of the invention, taken along the first direction, including an exemplary embodiment of the second grooves.

FIG. 3B illustrates a partial cross-sectional view of a portion of the exemplary embodiment of the light guide member, taken along the x-direction, including an exemplary embodiment of the second grooves. As discussed above, in embodiments of the invention, the second grooves 137 may be arranged along the second direction, e.g., y-direction, and/or may have a substantially or completely V-shaped cross-sectional shape, a vertical angle θ4, and a right and left angle θ5, as shown in FIG. 3B.

In embodiments of the invention, the vertical angle θ4, the right and left angle θ5, a depth D2, and a pitch P2 may be constant. For example, the depth D2 may be constant among the second grooves 137 and may have, e.g., a value of, or between about 0.005 mm to about 0.01 mm, the vertical angle θ4 may be constant among the second grooves 137 and may have, e.g., a value of, or between, about 90° to about 120°, the right and left angle θ5 may be constant among the second grooves 137 and may have a value of, or between about 30° to about 45°, and the pitch P2 may be constant among the second grooves 137 and may have a value of, or between, about 0.01 mm to about 0.1 mm An exemplary operation of the light guide member 131 follows below with reference to, e.g., FIG. 1. More particularly, an exemplary example of how light may be provided light to the LCD panel 100 via the light guide member 131, according to one or more aspects of the invention, follows below. Although reference may be made to the exemplary embodiment of the light guide member 131, the general operation described below may be applied to various embodiments of the invention.

The light radiated from the light source 132 may be incident on and may enter a side of the light guide member 131 via, e.g., the third side, e.g., an incident face, of the light guide member 131. A portion of the light incident on the light guide member 131 may be emitted to the first side 151 of the light guide member 131. An outgoing angle of the light exiting the light guide member 131 may be guided by the first and/or the second grooves 136, 137, so that light may be collected, provided and/or guided in a constant or a substantially constant direction, and may have a substantially uniform and/or completely uniform luminance distribution.

In embodiments of the invention, because light reflected at a portion of the light guide member 131 close to the light source 132a may be exactly and/or substantially a same intensity as that of light reflected in a portion of the light guide member 131 further from the light source 132a, e.g., due to a change in the pitch P1 and/or a change in the front angle θ2 of the first groove 136, the distribution of light may become entirely and/or substantially uniform regardless of a distance of a respective portion of the light guide member 131 relative to the light source.

Other portions of the incident light may be emitted toward, e.g., the second side 152 of the light guide member 131, and may exit from, e.g., the second side 152 of the light guide member 131 before being reflected by the reflective member 133 and directed back toward the light guide member 131. The light reflected by the reflective member 133 may then exit from the second side 152 of the light guide member 131 after further guidance, thereby maintaining the uniform and/or substantially uniform luminance distribution and the constant and/or substantially constant direction of the exiting light. The light uniformly and/or substantially uniformly distributed in the constant and/or substantially constant direction may be emitted from the second side 152 of the light guide member 131 to the prism sheet of the optical member 134. The light may then be uniformly or substantially uniformly emitted along a third direction, e.g., z direction, to a surface, e.g., entire surface, of the LCD panel 100 by, e.g., the groove (s) 135 of the prism sheet of the optical member 134.

Figure 5:
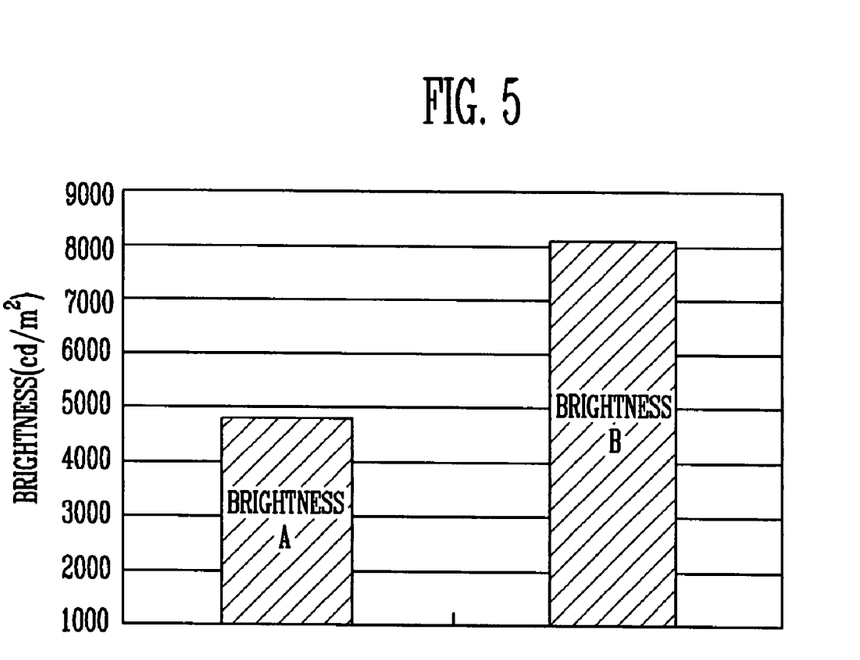
FIG. 5 illustrates a bar-chart of a measured brightness of a liquid crystal display device employing light guide member and/or backlight unit employing one or more aspects of the invention in relation to a measured brightness of a LCD employing a conventional light guide member or a conventional backlight unit.

FIG. 5 illustrates a bar-chart of a measured brightness of a LCD device including a light guide member and/or a BLU employing one or more aspects of the invention in relation to a measured brightness of a LCD employing a conventional light guide member or conventional backlight unit. More particularly, brightness A corresponds to a measurement result obtained from a LCD panel employing a conventional light emitting guide and/or BLU, and brightness B corresponds to a measurement result about the LCD panel 100 of the LCD device including a light guide member employing one or more aspects of the invention. As may be seen in FIG. 5, in comparison to a conventional LCD device, the LCD device including the BLU and/or light guide member 131 employing one or more aspects of the invention may have a higher and/or a more uniform brightness that may correspond to a value of, e.g., about 72% brighter over an entire region.

Although embodiments of the invention illustrated in the accompanying Figures illustrate a plurality of first grooves 136 on one face of the light guide member 131, the front angle θ2 of the first groove(s) 136 may be increase as a distance from the light source 132a increases, so that the distribution of light may be uniformly or substantially uniformly changed regardless of a distance from the light source 132a. That is, the front angle θ2 of the first groove(s) 136 may increase as a distance from, e.g., the third side 153 of the light guide member 151 increases. At the same time, diffusion of light may be increased so that, e.g., light having an entirely uniform and/or substantially uniform luminance distribution and/or a high brightness may be provided to the liquid crystal display panel of the display device, thereby improving appearance quality. In other words, since the front angle θ2 increases further from the light source, the amount of light reflected by the increasing front angle θ2 toward the optical member increases.

Although exemplary embodiments of the light guide member and the backlight unit may be described in relation to an exemplary LCD device, embodiments of the invention are not limited to use with an LCD device. Further, although reference is made to a "backlight unit" as an exemplary illumination device, such units are generally called "backlight" units because they may be arranged behind the display panel. However, aspects of the invention are not limited to such arrangements and/or uses.

Exemplary embodiments of the present invention have been disclosed herein, and although specific terms are employed, they are used and are to be interpreted in a generic and descriptive sense only and not for purpose of limitation.

For example, while V-grooves have been illustrated in embodiments of the invention, a front angle of the groove may be more important than the shape of the groove itself. Thus, other cross-sectional shapes that allow the varying front angles to be realized may be used. While a V-groove may be the most efficient manner to realize the appropriate wave pattern, the groove may, e.g., be curved or have a flat base, rather a V shape. Accordingly, it will be understood by those of ordinary skill in the art that various changes in form and details may be made without departing from the spirit and scope of the present invention as set forth in the following claims.

What is claimed is:

1. A light guide member for guiding light received from a light source, the light guide member comprising:
   a plurality of first grooves on a first side of the light guide member, the first grooves extending along a first direction, wherein:
   an angle of a reflective face of the first grooves increases as a distance from the light source increases such that the angle of the reflective face of one of the first grooves arranged closer to the light source is smaller than the angle of the reflective face of one of the first grooves arranged relatively further away from the light source, and
   a pitch of the first grooves decreases as a distance from the light source increases.

2. The light guide member as claimed in claim 1, wherein the first grooves have a substantially V-like cross-sectional shape, taken along a line crossing the first direction.

3. The light guide member as claimed in claim 1, wherein the angles of the reflective faces of the first grooves have a value of, or between, about 0.50° to about 10°.

4. The light guide member as claimed in claim 1, wherein at least one of a depth and a vertical angle of the first grooves is constant.

5. The light guide member as claimed in claim 4, wherein the depth of the first grooves has a value of, or between, about 0.001 mm to about 0.01 mm.

6. The light guide member as claimed in claim 4, wherein the vertical angle of the first grooves has a value of, or between, about 120° to about 170 °.

7. The light guide member as claimed in claim 1, wherein the pitch of the first grooves has values of, or between, about 0.1 mm to about 0.3mm on one portion of the light guide member to about 0.03mm to about 0.1 mm at another portion of the light guide member.

8. The light guide member as claimed in claim 1, further comprising a second groove on a second side of the light guide member, the second side opposing the first side, and the second groove extending along a second direction, the second direction being substantially perpendicular to the first direction.

9. The light guide member as claimed in claim 8, wherein the second groove has a substantially V-like cross-sectional shape, and a vertical angle of the second groove has a value of or between about 90° to about 120°.

10. The light guide member as claimed in claim 9, wherein the second groove has a depth of, or between, about 0.005 mm to about 0.01 mm and is arranged at a pitch of, or between, about 0.01 mm to about 0.1 mm.

11. The light guide member as claimed in claim 1, wherein the first direction is substantially perpendicular to a zero-degree radiation angle of the light from the light source.

12. A backlight unit (BLU) employable by a display device including a display panel, the BLU comprising:
    a light source;

a light guide member to which light from the light source is incident, the light guide member including a plurality of first grooves on a first side of the light guide member, the first grooves extending along a first direction; and an optical member providing the light provided from the light guide member to the display panel, wherein:

an angle of a reflective face of the first grooves increases as a distance from the light source increases such that the angle of the reflective face of one of the first grooves arranged closer to the light source is smaller than the angle of the reflective face of one of the first grooves arranged relatively further away from the light source, and a pitch of the first grooves decreases as a distance from the light source increases.

13. The BLU as claimed in claim 12, wherein the light source includes at least one of a cold cathode fluorescent tube and a LED.

14. The BLU as claimed in claim 12, wherein the angles of the reflective faces of the first grooves respectively have a value of, or between, about 0.5° to about 10°.

15. The BLU as claimed in claim 12, wherein the optical member includes a prism sheet.

16. The BLU as claimed in claim 12, wherein the optical member does not include a diffusion sheet.

17. The BLU as claimed in claim 12, wherein the first grooves have has a substantially V-like cross-sectional shape, taken along a direction crossing the first direction.

18. The BLU as claimed in claim 12, wherein the pitch of the first grooves has values of, or between, about 0.1 mm to about 0.3 mm on one portion of the light guide member to about 0.03 mm to about 0.1 mm at another portion of the light guide member.

19. The light guide member as claimed in claim 1, wherein the angles of the reflective face of the first grooves continuously increases as the distance from the light source increases.

20. The BLU as claimed in claim 12, wherein the angle of the reflective face of the first grooves continuously increases as the distance from the light source increases.

* * * * *